(12) United States Patent
Krisher

(10) Patent No.: US 6,422,967 B1
(45) Date of Patent: Jul. 23, 2002

(54) ALL-WHEEL-DRIVE MOTOR VEHICLE TRANSFER CASE WITH BEVEL GEAR DIFFERENTIAL

(75) Inventor: James A. Krisher, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/437,100

(22) Filed: Nov. 9, 1999

(51) Int. Cl.⁷ .................. F16H 48/08; B60K 17/346
(52) U.S. Cl. ............................. 475/230; 180/248
(58) Field of Search ........................ 475/230, 204, 475/206; 74/606 R, 665 GE, 665 T; 180/248

(56) References Cited

U.S. PATENT DOCUMENTS

| | | | |
|---|---|---|---|
| 1,835,412 A | * 12/1931 | Livingood | 180/248 X |
| 1,886,668 A | * 11/1932 | Gabli | 180/248 X |
| 3,605,523 A | * 9/1971 | O'Brien | 180/248 X |
| 4,031,780 A | * 6/1977 | Dolan et al. | 180/248 X |
| 4,601,359 A | * 7/1986 | Weismann et al. | 180/248 X |
| 4,967,861 A | * 11/1990 | Oyama et al. | 475/230 X |
| 5,041,068 A | * 8/1991 | Kobayashi | 475/206 X |
| 5,107,951 A | * 4/1992 | Kawamura | 475/230 X |
| 5,117,937 A | 6/1992 | Namioka | 74/665 T X |
| 5,168,956 A | 12/1992 | Namioka | 74/665 T X |
| 5,186,694 A | * 2/1993 | Cooper | 475/230 |
| 5,209,321 A | * 5/1993 | Sado | 180/248 |
| 5,323,666 A | 6/1994 | Etherington et al. | 74/665 GC |
| 5,499,951 A | * 3/1996 | Showalter | 475/204 |
| 5,545,102 A | * 8/1996 | Burgaman et al. | 475/230 |
| 5,647,814 A | * 7/1997 | Krisher | 475/230 |
| 5,833,566 A | * 11/1998 | Showalter | 475/204 X |

* cited by examiner

Primary Examiner—Charles A. Marmor
Assistant Examiner—Ankur Parekh
(74) Attorney, Agent, or Firm—Scott M. Oldham; Hahn Loeser +Parks, LLP

(57) ABSTRACT

A motor vehicle interaxle differential including a bevel gear design and utilizing an interaxle differential housing having a one-piece construction. A splined input shaft extending from the motor vehicle transmission mates with the inside diameter of a splined trunnion on the interaxle differential housing to provide input torque. The interior of the interaxle differential housing includes four (4) substantially flat thrust surfaces for support of left and right side gears and first and second pinion mate gears. The first pinion mate gear and the second pinion mate gear are retained in the interaxle differential housing by stub shafts which are threaded into the interaxle differential housing wall. The stub shaft design includes a shoulder to provide controlled perpendicularity and torque retention and a recessed socket head to facilitate installation. A housing endcap is utilized for sealing and supporting the interaxle differential housing bearing and the input shaft.

18 Claims, 2 Drawing Sheets

ALL-WHEEL-DRIVE MOTOR VEHICLE TRANSFER CASE WITH BEVEL GEAR DIFFERENTIAL

BACKGROUND AND SUMMARY OF THE INVENTION

The present invention relates generally to a new and novel all-wheel-drive motor vehicle transfer case with bevel gear differential. More particularly, the present invention relates to a new and novel all-wheel-drive motor vehicle transfer case with bevel gear differential which drives the front and rear axles of a motor vehicle and utilizes an interaxle differential housing having one-piece construction.

Four-wheel drive motor vehicles are becoming increasingly popular. Recently, certain motor vehicles have been provided with "full-time" four-wheel drive systems capable of operation on hard pavement at highway speeds. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle.

Known prior "full-time" four-wheel drive systems have generally utilized planetary type gear designs. While such known prior art planetary type gear designs have generally performed well in motor vehicle transfer cases, they are, in many cases, more complex, and thus more expensive to fabricate, than a bevel type gear design. Accordingly, such known prior art motor vehicle transfer cases utilizing traditional planetary type gear designs are more complex, and thus more costly, than desired.

A preferred embodiment of the present invention is, therefore, directed to an all-wheel-drive motor vehicle transfer case with bevel gear differential including an interaxle differential and shafts for driving the front and rear axles of a motor vehicle. The interaxle differential includes a bevel gear design and utilizes an interaxle differential housing having one-piece construction and a transfer case housing having one-piece construction. A splined input shaft extending from the motor vehicle transmission mates with the inside diameter of a splined trunnion on the interaxle differential housing to provide input torque. A left side gear is splined to a rear output shaft and an expanding ring is utilized to minimize endplay of the rear output shaft. A right side gear is splined to an intermediate shaft which drives a chain sprocket and chain which, in turn, drives a front output shaft. The intermediate shaft includes a shoulder and a snap ring for attachment to the right side gear to minimize endplay of the intermediate shaft. The chain sprocket is attached to the intermediate shaft by an expanding ring and the interaxle differential housing is supported by bearings, most preferably ball bearings. The intermediate shaft and the rear output shaft are supported by bearings, most preferably drawn cup needle roller bearings. The interior of the interaxle differential housing includes four (4) substantially flat thrust surfaces for support of the left side gear, a first pinion mate gear, the right side gear and second pinion mate gear. These four (4) substantially flat thrust surfaces allow the interaxle differential housing to be fabricated using a broaching manufacturing process to reduce fabrication cost. The first pinion mate gear and the second pinion mate gear are retained in the interaxle differential housing by stub shafts which are threaded into the interaxle differential housing wall. The stub shaft design includes a shoulder to provide controlled perpendicularity and torque retention and a recessed socket head to facilitate installation. A housing endcap is utilized for sealing and supporting the interaxle differential housing bearing and the input shaft and also to facilitate attachment of the all-wheel-drive motor vehicle transfer case with bevel gear differential to the motor vehicle transmission.

Other advantages and novel features of the present invention will become apparent in the following detailed description of the invention when considered in conjunction with the accompanying drawings.

DETAILED DESCRIPTION OF THE DRAWINGS

Figure 1:
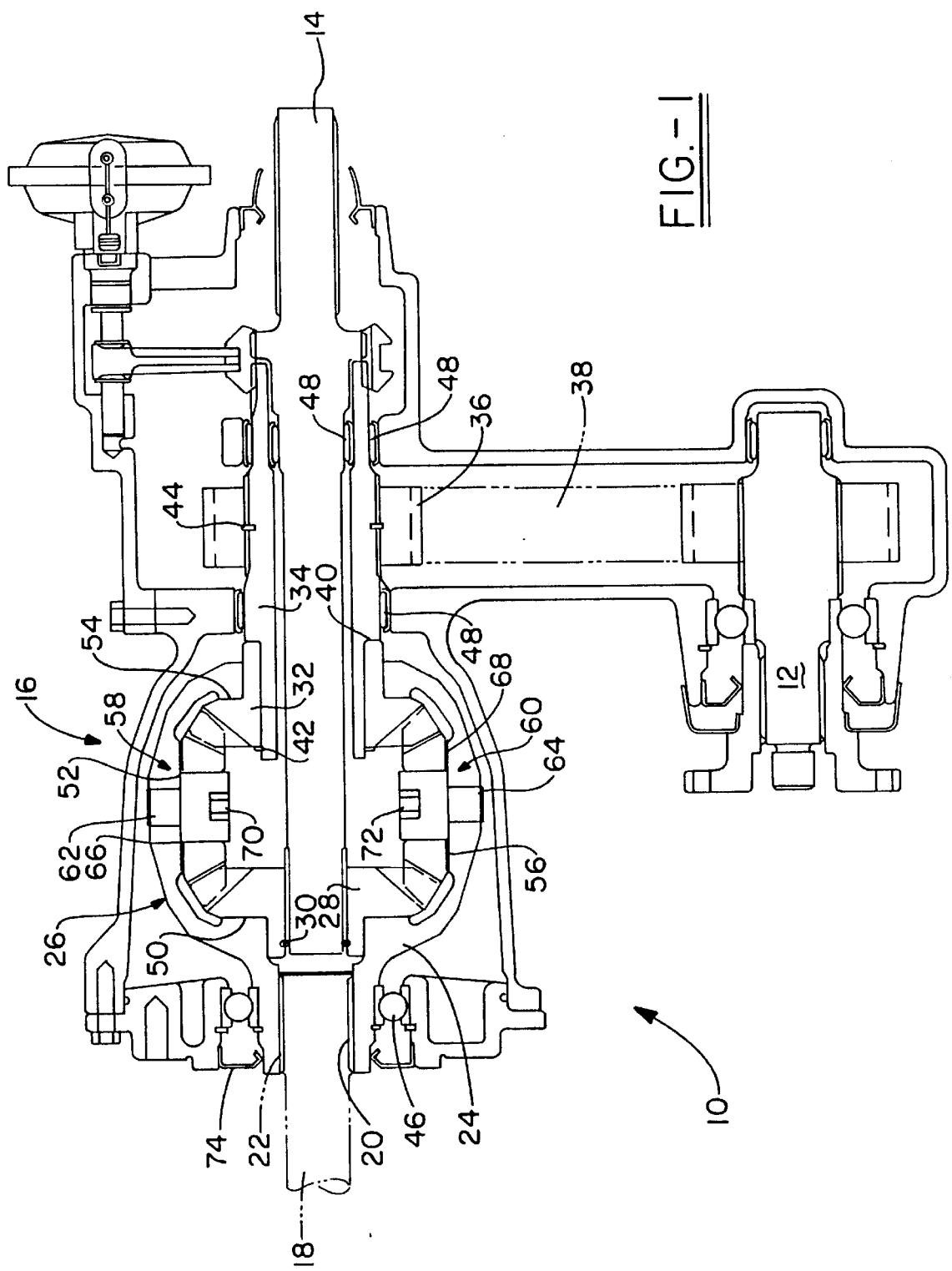
FIG. 1 is a side elevational view, partly in cross-section and partly in plan view, of an all-wheel-drive motor vehicle transfer case with bevel gear differential in accordance with a first preferred embodiment of the present invention.

In the following detailed description of a first preferred embodiment and a second preferred embodiment of the present invention, reference is made to the accompanying drawings which, in conjunction with this detailed description, illustrate and describe a first preferred embodiment and a second preferred embodiment of an all-wheel-drive motor vehicle transfer case with bevel gear differential, generally identified by reference numbers 10 and 110, respectively, in accordance with the present invention. Referring first to FIG. 1, which illustrates a side elevational view, partly in cross-section and partly in plan view, of an all-wheel-drive motor vehicle transfer case with bevel gear differential in accordance with a first preferred embodiment of the present invention, all-wheel-drive motor vehicle transfer case with bevel gear differential is generally identified by reference number 10. All-wheel-drive motor vehicle transfer case with bevel gear differential 10 is attached to front output shaft 12 which drives the front axle (not shown) of the motor vehicle and rear output shaft 14 which drives the rear axle (not shown) of the motor vehicle. All-wheel-drive motor vehicle transfer case with bevel gear differential 10 includes interaxle differential 16 which has a bevel gear design and preferably utilizes an interaxle differential housing having one-piece construction. Input shaft 18 is connected to, and receives rotational torque from, the motor vehicle transmission (not shown). Input shaft 18 preferably includes a series of external longitudinally extending splines 20 on the end distal from the motor vehicle transmission (not shown) which mate with, and are rotationally connected to, corresponding internal longitudinally extending splines 22 in trunnion 24 on interaxle differential housing 26 to provide input torque to all-wheel-drive motor vehicle transfer case with bevel gear differential 10.

Left side gear 28 is preferably splined to rear output shaft 14 and expanding ring 30 is preferably utilized to minimize endplay of rear output shaft 14. Right side gear 32 is preferably splined to intermediate shaft 34 which drives chain sprocket 36 and chain 38 which, in turn, drives front output shaft 12. Intermediate shaft 34 preferably includes shoulder 40 and snap ring 42 to attach right side gear 32 to intermediate shaft 34 and minimize endplay of intermediate shaft 34. Chain sprocket 36 is preferably attached to intermediate shaft 34 by expanding ring 44 and interaxle differential housing 26 is preferably rotationally supported by bearings 46, most preferably ball bearings. Intermediate shaft 34 and rear output shaft 14 are preferably rotationally supported by bearings 48, most preferably drawn cup needle roller bearings.

The interior of interaxle differential housing 26 preferably includes four (4) substantially flat thrust surfaces 50, 52, 54 and 56 to provide clearance and support for left side gear 28, first pinion mate gear 58, right side gear 32 and second pinion mate gear 60. The four (4) substantially flat thrust surfaces 50, 52, 54 and 56 are preferably fabricated by using a broaching manufacturing process to reduce the cost of fabrication of interaxle differential housing 26. First pinion mate gear 58 and second pinion mate gear 60 are retained in interaxle differential housing 26 by first stub shaft 62 and second stub shaft 64, respectively, which are threadably received in the wall of interaxle differential housing 26. First stub shaft 62 and second stub shaft 64 include first shoulder 66 and second shoulder 68, respectively, to provide controlled perpendicularity and torque retention between first stub shaft 62, second stub shaft 64 and interaxle differential housing 26. In addition, first stub shaft 62 and second stub shaft 64 preferably include recessed first socket head 70 and recessed second socket head 72, respectively, to facilitate installation of first stub shaft 62 and second stub shaft 64 into interaxle differential housing 26. Although recessed first socket head 70 and recessed second socket head 72 are shown positioned on the interior side of first stub shaft 62 and second stub shaft 64, respectively, it will be apparent to those having ordinary skill in the art to which the subject matter pertains that alternatively, recessed first socket head 70 and recessed second socket head 72 could be positioned on the threaded end of first stub shaft 62 and second stub shaft 64, respectively, if desired. Housing endcap 74 is provided to seal and support bearings 46, input shaft 18 and facilitate attachment of all-wheel-drive motor vehicle transfer case with bevel gear differential 10 to the motor vehicle transmission (not shown).

All-wheel-drive motor vehicle transfer case with bevel gear differential 10 includes several features which provide advantages over known prior art devices. In particular, all-wheel-drive motor vehicle transfer case with bevel gear differential 10 has a bevel gear design rather than the more customary planetary gear design, and it is generally possible to fabricate a bevel gear design at a lower cost than the more customary planetary gear designs. In addition, torque is applied to interaxle differential 16 by internal longitudinally extending splines 22 in trunnion 24 which allows interaxle differential housing 26 to be of one-piece construction which reduces the complexity and cost of interaxle differential housing 26. First pinion mate gear 58 and second pinion mate gear 60 include first stub shaft 62 and second stub shaft 64, respectively, which are threadably received in interaxle differential housing 26 and first pinion mate gear 58 and second pinion mate gear 60 include first shoulder 66 and second shoulder 68, respectively, to facilitate maintaining perpendicularity of first pinion mate gear 58 and second pinion mate gear 60 to interaxle differential housing 26 and permit sufficient installation torque to preclude loosening of first pinion mate gear 58 and second pinion mate gear 60.

Interaxle differential housing 26 includes four (4) substantially flat thrust surfaces 50, 52, 54 and 56 for left side gear 28, first pinion mate gear 58, right side gear 32 and second pinion mate gear 60, respectively. While known prior art pinion mate gears are typically spherical to facilitate assembly, the use of four (4) substantially flat thrust surfaces 50, 52, 54 and 56 allows interaxle differential housing 26 to be fabricated using a broaching manufacturing process, rather than more expensive machining processes.

Transfer case housing 76 is preferably of a one-piece design to improve rigidity, reduce leakage and reduce manufacturing cost. This is in contrast to known prior art transfer cases which are typically of two-piece design, requiring preassembly for machining operations and subsequent disassembly to install the internal components. All-wheel-drive motor vehicle transfer case with bevel gear differential 10 includes two (2) "caps" to facilitate installation of the interior components. Housing endcap 74 also functions as an adapter for various motor vehicle transmissions. Thus, all-wheel-drive motor vehicle transfer case with bevel gear differential 10, including its internal components, can be used with multiple motor vehicle transmissions. Furthermore, the design of all-wheel-drive motor vehicle transfer case with bevel gear differential 10 is easily expandable to include various biasing concepts, for example viscous, gerotor or electric. While a pneumatically controlled mechanical lock-up is shown in FIG. 1 for reference, various biasing devices could be attached to intermediate shaft 34 and rear output shaft 14. In all variations, transfer case housing 76 would remain of one-piece construction.

Figure 2:
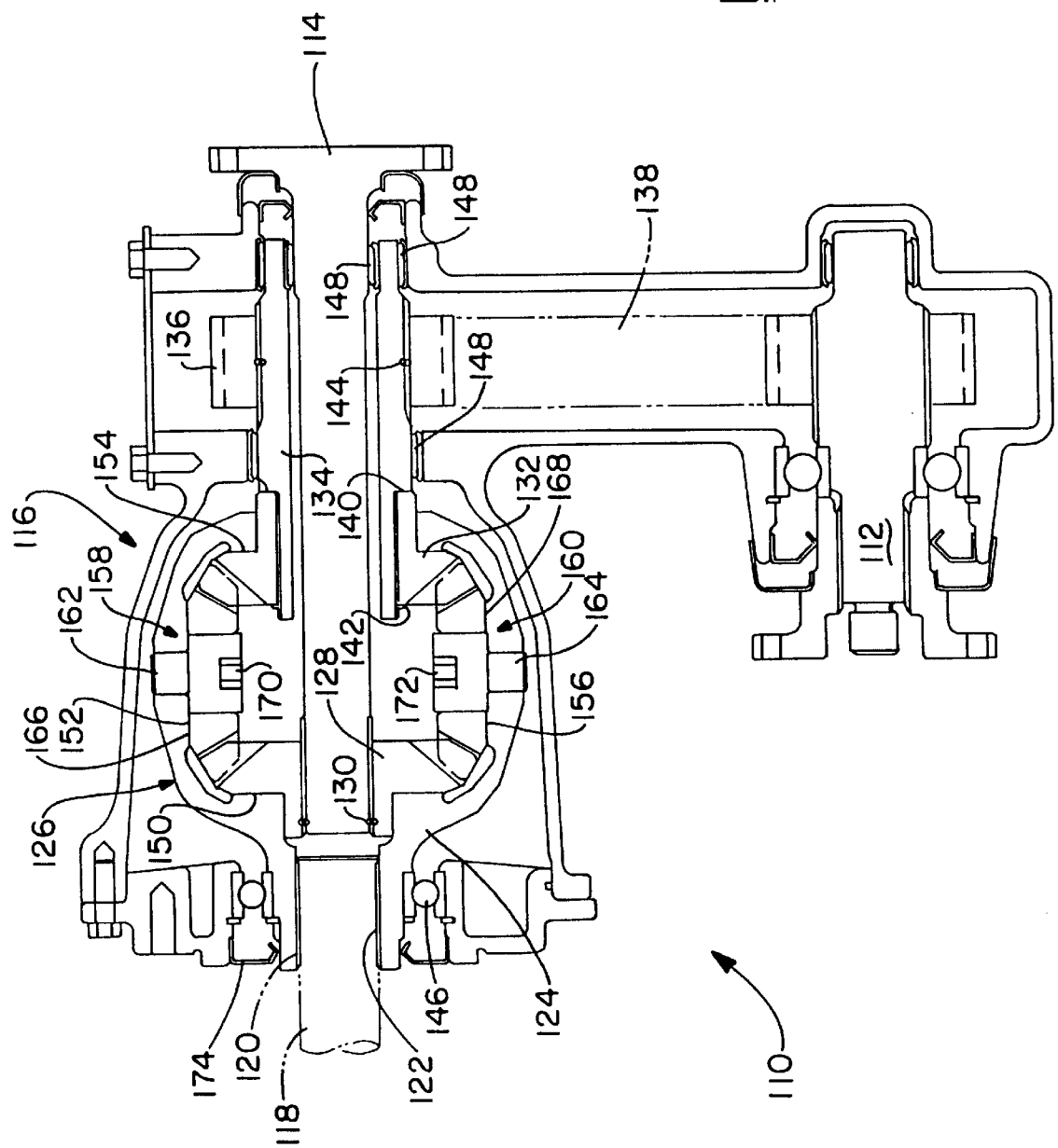
FIG. 2 is a side elevational view, partly in cross-section and partly in plan view, of an all-wheel-drive motor vehicle transfer case with bevel gear differential in accordance with a second preferred embodiment of the present invention.

Referring to FIG. 2, a second embodiment of an all-wheeldrive motor vehicle transfer case with bevel gear differential is shown, generally identified by reference number 110. Other components in all-wheel-drive motor vehicle transfer case with bevel gear differential 110 are generally similar to corresponding components in all-wheel-drive motor vehicle transfer case with bevel gear differential 10 and are identified with the reference numbers used in conjunction with the description of all-wheel-drive motor vehicle transfer case with bevel gear differential 10, but with the addition of a "1" preceding the reference number. Thus, the front output shaft in all-wheel-drive motor vehicle transfer case with bevel gear differential 10 is identified by reference number 12, while the front output shaft in all-wheel-drive motor vehicle transfer case with bevel gear differential 110 is identified by reference number 112.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle interaxle differential for driving a front output shaft and a rear output shaft to drive the front axle and the rear axle, respectively, of a motor vehicle, said motor vehicle interaxle differential comprising an interaxle differential housing of one-piece construction, said interaxle differential housing having four (4) substantially flat thrust surfaces to support a left side gear, a first pinion mate gear, a right side gear, and a second pinion mate gear therein, said interaxle differential housing further comprising a trunnion having internal longitudinally extending splines which receive and rotationally engage with corresponding external longitudinally extending splines on an input shaft to provide input torque to said motor vehicle interaxle differential.

2. The motor vehicle interaxle differential in accordance with claim 1, wherein said left side gear, said first pinion mate gear, said right side gear and said second pinion mate gear are of a bevel gear design.

3. The motor vehicle interaxle differential in accordance with claim 1, wherein said four (4) substantially flat thrust surfaces are formed by a broaching manufacturing process.

4. The motor vehicle interaxle differential in accordance with claim 1, wherein said left side gear is splined to said rear output shaft and an expanding ring is utilized to minimize endplay of said rear output shaft.

5. The motor vehicle interaxle differential in accordance with claim 1, wherein said right side gear is splined to an intermediate shaft which drives a chain sprocket and chain which, in turn, drives said front output shaft.

6. The motor vehicle interaxle differential in accordance with claim 5, wherein said intermediate shaft includes a shoulder and a snap ring to attach said right side gear to said intermediate shaft and minimize endplay of said intermediate shaft.

7. The motor vehicle interaxle differential in accordance with claim 6, wherein said chain sprocket is attached to said intermediate shaft by an expanding ring, said interaxle differential housing is rotationally supported by ball bearings and said intermediate shaft and said rear output shaft are rotationally supported by drawn cup needle roller bearings.

8. The motor vehicle interaxle differential in accordance with claim 7, wherein said motor vehicle interaxle differential includes a housing endcap which seals and supports said roller bearings and said input shaft.

9. A motor vehicle interaxle differential for driving the front axle and rear axle of a motor vehicle, said motor vehicle interaxle differential comprising an interaxle differential housing having four (4) thrust surfaces to support a left side gear, a first pinion mate gear, a right side gear and a second pinion mate gear therein, wherein said first pinion mate gear and said second pinion mate gear are rotationally supported by a first stub shaft and second stub shaft respectively, a first shoulder and a second shoulder being provided on said first and second stub shafts, respectively, said first and second shoulders abutting said interaxle differential housing to provide controlled perpendicularity and torque retention in said interaxle differential housing.

10. The motor vehicle interaxle differential in accordance with claim 9, wherein said first pinion mate gear and said second pinion mate gear also include a first stub shaft and a second stub shaft, respectively, and said first stub shaft and said second stub shaft are received in said interaxle differential housing.

11. The motor vehicle interaxle differential in accordance with claim 10, wherein said first stub shaft and said second stub shaft each include external threads which are received in corresponding internal threads in said interaxle differential housing to retain and support said first pinion mate gear and said second pinion mate gear.

12. The motor vehicle interaxle differential in accordance with claim 11, wherein said first pinion mate gear and said second pinion mate gear include a recessed first socket head and a recessed second socket head, respectively, to facilitate the installation of said first pinion mate gear and said second pinion mate gear in said interaxle differential housing.

13. The motor vehicle interaxle differential in accordance with claim 12, wherein said recessed first socket head and said recessed second socket head are positioned in the interior surface of said first pinion mate gear and said second pinion mate gear, respectively, to facilitate installation of said first pinion mate gear and said second pinion mate gear in said interaxle differential housing.

14. The motor vehicle interaxle differential in accordance with claim 12, wherein said recessed first socket head and said recessed second socket head are positioned in the threaded portion of said first stub shaft and said second stub shaft of said first pinion mate gear and said second pinion mate gear, respectively, to facilitate installation of said first pinion mate gear and said second pinion mate gear in said interaxle differential housing.

15. The motor vehicle interaxle differential in accordance with claim 9, wherein said left side gear, said first pinion mate gear, said right side gear and said second pinion mate gear are of a bevel gear design.

16. The motor vehicle interaxle differential in accordance with claim 9, wherein each of said four (4) thrust surfaces are substantially flat and said four (4) thrust surfaces are formed by a broaching manufacturing process.

17. The motor vehicle interaxle differential in accordance with claim 9, wherein said motor vehicle interaxle differential includes a trunnion having internal longitudinally extending splines which receive and rotationally engage with corresponding external longitudinally extending splines on an input shaft to provide input torque to said motor vehicle interaxle differential.

18. The motor vehicle interaxle differential in accordance with claim 9, wherein said motor vehicle interaxle differential includes a housing endcap which seals and supports an input shaft providing input torque to said motor vehicle interaxle differention, and roller bearings associated with said input shaft.

* * * * *